G. P. ROSE.
WHIP-SOCKETS.
No. 195,536. Patented Sept. 25, 1877.
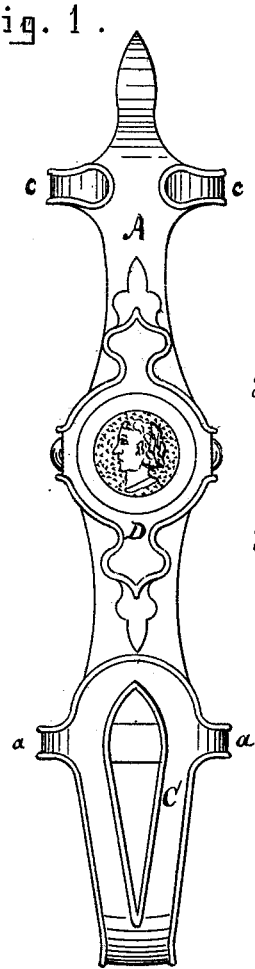
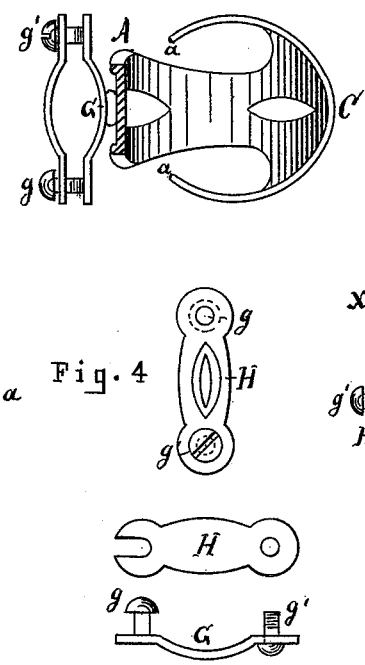
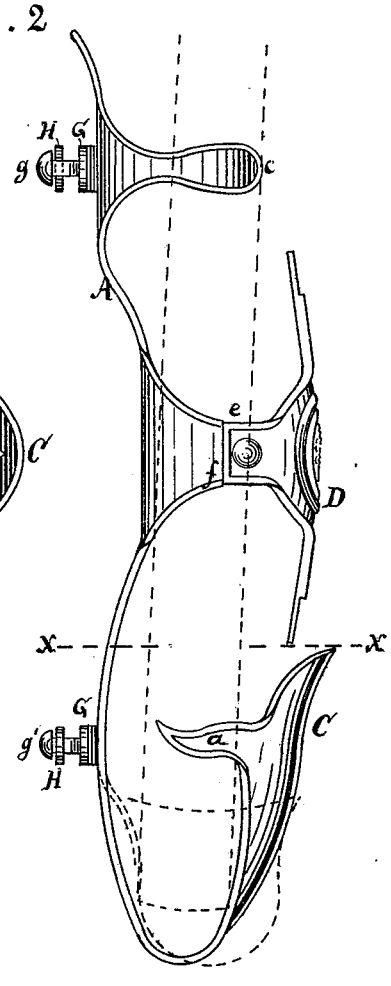
WITNESSES:
Julius Wilcke
N. Cowles
INVENTOR:
George P. Rose
By Gridley & Sherburne
Attys.

UNITED STATES PATENT OFFICE.

GEORGE P. ROSE, OF FREEPORT, ILLINOIS.

IMPROVEMENT IN WHIP-SOCKETS.

Specification forming part of Letters Patent No. 195,536, dated September 25, 1877; application filed September 13, 1876.

*To all whom it may concern:*

Be it known that I, GEORGE P. ROSE, of Freeport, in the county of Stephenson and State of Illinois, have invented new and useful Improvements in Whip-Sockets; and I do hereby declare the following to be a full, clear, and exact description thereof, which will enable others skilled in the art to which it appertains to make and use the same, reference being had to the accompanying drawing, forming part of this specification, in which—

Figure 1 represents a front elevation of a whip-socket embodying my invention. Fig. 2 represents a side elevation of the same. Fig. 3 represents a sectional plan of the same, taken on the line $xx$ in Fig. 2; and Fig. 4 represents a back view of one of the clamps employed in securing the socket to the dash-board of the carriage.

Like letters of reference indicate like parts.

My invention relates to that class of whip-sockets secured to the dash-board of carriages for the purpose of receiving and holding the whip; and my invention consists in the novel construction of the socket, and also in the means employed for connecting the socket to the dash-board, as is hereinafter more fully described and claimed.

In the drawing, A represents the back section of the socket, which is made of any suitable metal, and is curved upon its edges in the form shown in Fig. 1, and is bent upward at its lower end, as shown in Figs. 1 and 2, so as to form the lower part C of the front section of the socket. The part C is provided, near its upper end, with arms $a\,a$, made as a part of the same, which are bent backward in a circular form, as shown in Fig. 3, and so as to form an aperture, through which the butt of the whip-stock passes. The back section A is also provided, near its upper end, with arms $c\,c$ as a part thereof, which are bent forward in a circular form, so as to form an aperture corresponding in size and shape with the aperture formed by the arms $a\,a$.

D represents the front part of the socket, and is so curved as to correspond with the circle described by the arms $c\,c$, and is provided on each side, at or near its center, with ears $e$, which are bent backward toward the back section A, as shown in Fig. 2. The back section A is provided on each side, at or near its center, with like ears $f$, which are curved forward toward the front part D, and are riveted or otherwise secured to the ears $e$ of the front part D. The part D serves to guide the butt of the whip-stock so as to cause it at all times to pass between the arms $a\,a$ of the part C when the whip-stock is being dropped into the socket.

G G are cross-bars, which are riveted or otherwise permanently secured to the back section A, forming the front portion of the clamp for securing the socket proper to the dash-board, and each of said cross-bars is provided at one end with a rivet, $g$, permanently secured therein, and projecting therefrom at a right angle to the plane of the back, as shown in Figs. 2 and 3, and at the opposite end with a screw, $g'$, projecting in a like manner, and arranged to admit of being removed and readjusted at will. The cross-bars are bent at their centers to fit partly around the vertical rods of the dash-board.

H H' are clamp-plates, which are also bent at their centers, as shown in Fig. 3, so when compressed against the cross-bars the vertical rod of the dash-board is firmly clamped between the clamp-plates and cross-bars, and thereby holding the socket in a fixed position. One end of each of the clamp-plates is provided with a slot, as shown by dotted lines in Fig. 4, which will allow the end of the plate to pass under the head of the rivet $g$, as shown in Fig. 2, and at the opposite end with an aperture, through which the screw $g'$ passes.

The object of slotting one end of the clamp-plates, as described, is to allow the same to be easily adjusted; but I do not intend to limit myself to forming the said slots in the clamp-plates, as I sometimes form them in the ends of the cross-bars, and secure the rivet in the clamp-plates, which will produce the same result.

It will be observed that the several parts of the whip-socket are so formed that the arms $a\,a$ and $c\,c$ encircle the whip-stock, and at the same time the butt of the stock is wedged between the parts A and C, so that when the whip is forced gently downward into the socket it will be held firmly therein, and thus adapting the socket to be used for holding whips of various sizes.

Having thus described my invention, what I claim as new, and desire to secure by Letters Patent, is—

1. In a whip-socket, the section A, made from a single piece, provided at its upper end with the arms *c c*, bent to encircle the whip-stock, and bent upward at its lower end to form the part C, said part C being adjusted to clamp the whip-stock between it and the back, and provided with the arms *a a*, curved to encircle the stock, substantially as specified.

2. In a whip-socket, the combination, with the section A, bent at its upper end to form the arms *c c*, and at its lower end to form the part C, as described, of the front part D, secured to the section A between the arms *c c* and the part C, substantially as and for the purpose specified.

GEORGE P. ROSE.

Witnesses:
A. C. GRIDLEY,
A. H. SHERBURNE.